(12) United States Patent
Murai (10) Patent No.: US 11,518,440 B2
(45) Date of Patent: Dec. 6, 2022

(54) VEHICLE FRONT PORTION STRUCTURE

(71) Applicant: TOYOTA JIDOSHA KABUSHIKI KAISHA, Aichi-ken (JP)

(72) Inventor: Daisuke Murai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 215 days.

(21) Appl. No.: 16/746,961

(22) Filed: Jan. 20, 2020

(65) Prior Publication Data
US 2020/0262483 A1 Aug. 20, 2020

(30) Foreign Application Priority Data
Feb. 19, 2019 (JP) .............................. JP2019-027798

(51) Int. Cl.
*B60K 5/12* (2006.01)
*B62D 21/15* (2006.01)
*B60K 1/00* (2006.01)

(52) U.S. Cl.
CPC .............. *B62D 21/152* (2013.01); *B60K 1/00* (2013.01)

(58) Field of Classification Search
CPC . B62D 21/11; B60K 5/12; B60K 1/00; B60K 5/1216; B60G 2204/4307; B60G 2204/18; B60G 2204/147; B60G 2200/23
See application file for complete search history.

(56) References Cited

U.S. PATENT DOCUMENTS 4,583,614 A * 4/1986 Knight ..................... B60G 3/24
180/295
5,178,406 A * 1/1993 Reynolds ........... B60G 21/0551
267/277

(Continued)

FOREIGN PATENT DOCUMENTS

CN 104943523 A * 9/2015 ........... B60K 5/1216
DE 102006011782 A1 * 4/2007 ......... B60G 21/0551

(Continued)

OTHER PUBLICATIONS

Laurent Gauthier, Support for Heat Engine Assembly of Motor Vehicle, Has Bearing Supporting Anti-roll Bar and Placed in Housing, Where Support and Bearing Are Made of Different Materials and Have Parallelepiped Shape, Feb. 10, 2012, EPO, FR 2 963 583 A1, Machine Translation of Description (Year: 2012).*

*Primary Examiner* — James A English
(74) *Attorney, Agent, or Firm* — Hauptman Ham, LLP (57) ABSTRACT

A vehicle front portion structure includes a motor, a stabilizer having an extending portion disposed at a vehicle front side of the motor and that extends further in a vehicle width direction than a length of the motor, and having an arm portion that extends toward a vehicle rear side from each end of the extending portion, a plurality of motor fixing portions, a part of the motor fixing portions being disposed at respective outer sides in the vehicle width direction relative to the motor and at a position between the motor and the extending portion, and a plurality of stabilizer support portions that support respective end parts of the extending portion, the stabilizer support portions being disposed further toward a front side than the motor fixing portions, and at least a part of the stabilizer support portions being aligned with the motor fixing portions in the vehicle front-rear direction.

4 Claims, 5 Drawing Sheets

(56) References Cited

U.S. PATENT DOCUMENTS

| | | | |
|---|---|---|---|
| 6,588,534 B1 * | 7/2003 | Daly | B60G 21/0551 180/297 |
| 2007/0051549 A1 | 3/2007 | Fukuda | |
| 2021/0291613 A1 * | 9/2021 | Nagayama | B60G 21/0551 |

FOREIGN PATENT DOCUMENTS

| | | | | |
|---|---|---|---|---|
| FR | 2963583 A1 * | 2/2012 | | B60K 5/12 |
| JP | 200085616 A | 3/2000 | | |
| JP | 2004-161260 A | 6/2004 | | |
| JP | 2016-67179 A | 4/2016 | | |

* cited by examiner

VEHICLE FRONT PORTION STRUCTURE

CROSS-REFERENCE TO RELATED APPLICATION

This application claims priority under 35 USC 119 from Japanese Patent Application No. 2019-27798 filed on Feb. 19, 2019, the disclosure of which is incorporated by reference herein in its entirety.

BACKGROUND

Technical Field

The present disclosure relates to a vehicle front portion structure.

Related Art

Japanese Patent Application Laid-Open No. 2004-161260 discloses a mounting structure for a drive motor in which a drive motor unit is mounted at a suspension member using two front motor mounts and one rear motor mount.

SUMMARY

Incidentally, in a frontal collision of a vehicle, in order to reduce the impact force, deformation of the vehicle body in the front-rear direction of the vehicle (hereinafter referred to as "stroke") is required. Here, in the structure of JP-A-2004-161260, since a motor fixing portion is disposed at the front side of the motor, it is difficult to secure the stroke of the motor fixing portion with respect to the motor in the vehicle front-rear direction (dead stroke is increased).

However, in a case in which the motor fixing portion is disposed at a position that is displaced in the vehicle width direction with respect to the motor in order to suppress dead stroke, there is a possibility that the motor fixing portion will contact a stabilizer that deforms torsionally. That is, there is room for improvement in terms of reducing dead stroke in the vehicle and in terms of preventing contact between the stabilizer and the motor fixing portion.

In view of these circumstances, the present disclosure provides a vehicle front portion structure capable of reducing dead stroke in a vehicle and preventing contact between a stabilizer and a motor fixing portion.

A vehicle front portion structure of a first aspect of the present disclosure includes: a motor; a stabilizer having an extending portion that is disposed at a vehicle front side of the motor and that extends further in a vehicle width direction than a length of the motor in the vehicle width direction, and having an arm portion that extends toward a vehicle rear side from each end, in the vehicle width direction, of the extending portion; a plurality of motor fixing portions that fix the motor to a vehicle body, at least a part of the motor fixing portions being disposed at respective outer sides in the vehicle width direction relative to the motor and at a position between the motor and the extending portion, as viewed in a vehicle vertical direction; and a plurality of stabilizer support portions that are fixed to the vehicle body and that support respective end parts, in the vehicle width direction, of the extending portion, the stabilizer support portions being disposed further toward a front side in a vehicle front-rear direction than the motor fixing portions, and at least a part of the stabilizer support portions being aligned with the motor fixing portions in the vehicle front-rear direction.

In the vehicle front portion structure according to the first aspect, the motor fixing portions are disposed at both outer sides in the vehicle width direction with respect to the motor and between the motor and the extending portion. Thus, the distance between the motor and the motor fixing portions can be increased as compared with a configuration in which a motor fixing portion is disposed at the front side of the vehicle with respect to the center in the vehicle width direction of the motor. A longer distance between the motor and the motor fixing portions means a broader range across which the motor fixing portions can be deformed when a collision load is input to the vehicle body. In other words, dead stroke of the motor fixing portions in the vehicle can be reduced.

Furthermore, in the vehicle front portion structure according to the first aspect, the stabilizer support portions are disposed further to the front side in the vehicle front-rear direction than the motor fixing portions, and at least a part of the stabilizer support portions is disposed so as to be aligned with the motor fixing portions in the vehicle front-rear direction. Further, the stabilizer support portions support both ends of the extending portion. Since the arm portions of the stabilizer are disposed apart in the vehicle width direction with respect to the motor fixing portions and the stabilizer support portions inhibit the arm portions from deforming toward the motor fixing portions, it is possible to suppress contact between the stabilizer and the motor fixing portions.

That is, in the vehicle front portion structure according to the first aspect, dead stroke of the motor fixing portions in the vehicle can be reduced and contact between the stabilizer and the motor fixing portions can be suppressed.

The vehicle front portion structure of a second aspect of the present disclosure includes plural fixing members, a motor fixing portion and a stabilizer support portion being integrally formed in each of the fixing members.

In the vehicle front portion structure according to the second aspect, since the motor fixing portions and the stabilizer support portions are formed as a plurality of integrally formed fixing members, the number of fixing regions of the motor fixing portions and the stabilizer support portions in the vehicle body is reduced as compared to a configuration in which the motor fixing portions and the stabilizer support portions are separate bodies. Here, these fixing regions are regions that are less likely to be deformed than a region that is not fixed and are regions at which dead stroke occurs. In other words, since the fixing regions of the motor fixing portion and the stabilizer supporting portion are replaced with a deformable portion by being integrally molded, dead stroke can be shortened compared to a configuration in which the motor fixing portions and the stabilizer support portions are separate bodies.

The vehicle front portion structure according to a third aspect of the present disclosure is the vehicle front portion structure according to the first aspect, in which each of the motor fixing portions includes a first attachment portion that is configured to be attached to a suspension of a vehicle, and a second attachment portion that is attached to the motor and that extends from the first attachment portion rearward and toward an inner side in the vehicle width direction, toward the motor.

In the vehicle front portion structure according to the third aspect, the second attachment portion of the motor fixing portion extends from the first attachment portion rearward and toward the inner side in the vehicle width direction, toward the motor, and is attached to the motor. The distance between the motor and the motor fixing portion can be increased. When a collision load is input to the vehicle body, the range across which the motor fixing portion can be deformed is thereby increased.

A vehicle front portion structure according to a fourth aspect of the present disclosure is the vehicle front portion structure according to the second aspect, in which a motor fixing portion extends from a stabilizer support portion, rearward and inward in the vehicle width direction, toward the motor, and is attached to the motor, and the stabilizer support portion is configured to be attached to a suspension of a vehicle.

In the vehicle front portion structure according to the fourth aspect, the motor fixing portion extends from the stabilizer support portion, rearward and inward in the vehicle width direction, toward the motor, and is attached to the motor. The distance between the motor and the motor fixing portion can be increased. When a collision load is input to the vehicle body, the range across which the motor fixing portion can be deformed is thereby increased.

According to the present disclosure, it is possible to obtain a vehicle front portion structure capable of reducing dead stroke of the motor fixing portion in a vehicle and suppressing contact between the stabilizer and the motor fixing portion.

DETAILED DESCRIPTION

First Embodiment

Figure 1:
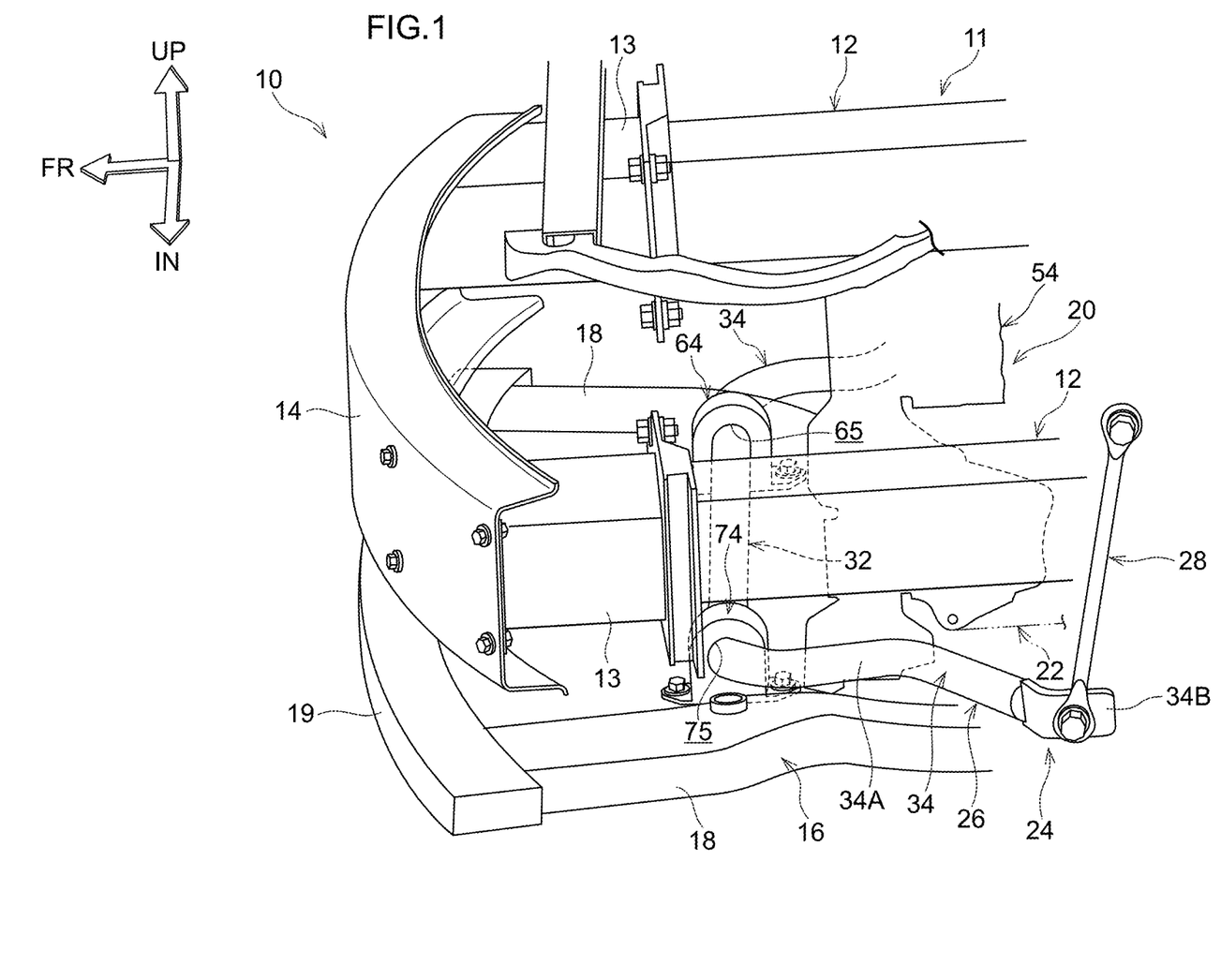
FIG. 1 is a perspective view showing an internal structure of a front portion of a vehicle to which a vehicle front portion structure according to a first embodiment is applied.

FIG. 1 shows the internal configuration of a front part of a vehicle 10 to which a vehicle front portion structure 20 according to the first embodiment is applied. In FIG. 1, a part of a motor 22, which is described later, is indicated by a broken line. The vehicle 10 includes a vehicle body 11 and the vehicle front portion structure 20. The vehicle body 11 includes a front side member 12 and a suspension member 16.

In each of the drawings, the arrow FR indicates a front side in a front-rear direction of the vehicle, the arrow UP indicates an upper side in a vertical direction of the vehicle, the arrow IN indicates an inner side in a vehicle width direction, and the arrow OUT indicates an outer side in the vehicle width direction. The vehicle front-rear direction, the vehicle vertical direction, and the vehicle width direction are directions orthogonal to each other. Hereinafter, when explanation is given by merely using front-rear, vertical and left-right directions, these refer to the front-rear of the vehicle front-rear direction, the vertical of the vehicle vertical direction and the left and right in the vehicle width direction when facing in the direction of forward travel, unless otherwise specified.

[Overall Configuration]

The front side member 12 is a member extending in the vehicle front-rear direction. Further, a left and right pair of the front side members 12 is provided with an interval therebetween in the vehicle width direction. A front bumper reinforcement 14 is provided at the front end side of the pair of front side members 12 via a crush box 13.

The suspension member 16 is formed substantially in a ladder shape in vehicle plan view. Specifically, the suspension member 16 includes a pair of left and right side rails 18 extending in the vehicle front-rear direction with an interval therebetween in the vehicle width direction, and a plurality of cross members (not shown) including a cross member 19 connecting the left and right side rails 18 in the vehicle width direction.

[Configuration of Main Portions]

Next, the vehicle front portion structure 20 will be described.

Figure 2:
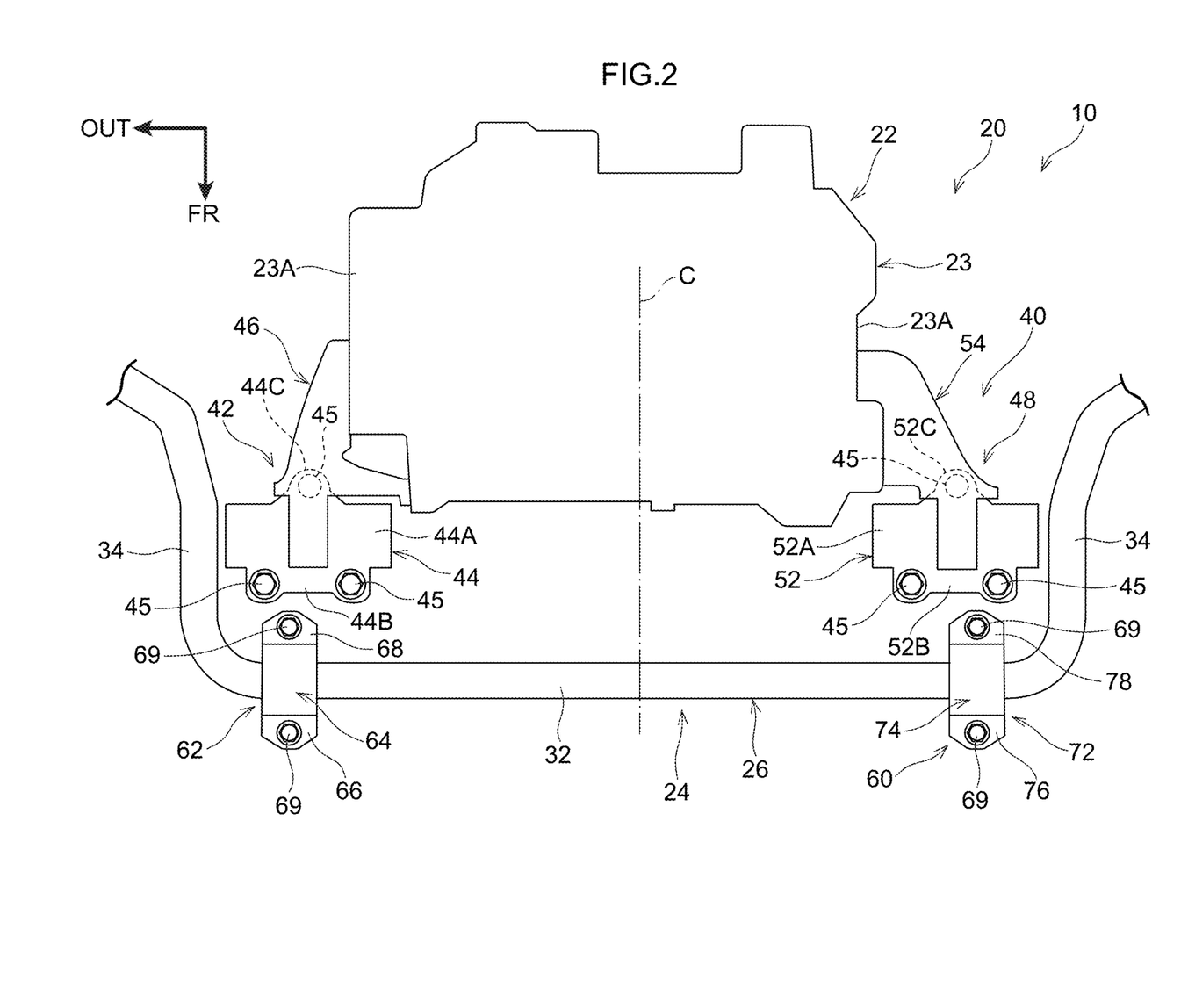
FIG. 2 is a plan view of the vehicle front portion structure pertaining to the first embodiment.

The vehicle front portion structure 20 shown in FIG. 2 includes a motor 22, a stabilizer 24, a motor mount 40 as an example of a motor fixing portion, and a stabilizer mount 60 as an example of a stabilizer support portion.

<Motor>

The motor 22 is provided with a housing 23 configuring an outer shell thereof. The housing 23 is formed in a hollow box shape. Inside the housing 23, a motor main body, a counter gear mechanism, and a differential gear mechanism, which are not shown, are provided, for example. The motor main body is driven by electric power that is supplied thereto. The driving force of the motor main body drives a drive shaft and a front wheel (which are not shown) via a counter gear mechanism and a differential gear mechanism. Sidewalls 23A are erected at positions at both ends of the housing 23 in the vehicle width direction. A second attachment portion 46 and a second attachment portion 54 of a motor mount 40, which are described later, are attached to the side walls 23A.

<Stabilizer>

The stabilizer 24 shown in FIG. 1 has, as an example, a stabilizer bar 26 and a rod-shaped stabilizer link 28 extending in the vertical direction of the vehicle. The stabilizer bar 26 is formed of a pipe material, for example, but may be formed of a solid rod material. Further, the stabilizer bar 26 has a torsion bar portion 32 as an example of an extending portion, and an arm portion 34 as an example of an arm portion.

(Torsion Bar Portion)

The torsion bar portion 32 shown in FIG. 2 is formed in a cylindrical shape. The torsion bar portion 32 is disposed at the front side of the motor 22 and extends further in the vehicle width direction than the length of the motor 22 in the vehicle width direction. Specifically, the torsion bar portion 32 is disposed at the front side at an interval relative to the motor 22 and the motor mount 40. The torsion bar portion 32 is supported by a stabilizer mount 60, described later, in a rotatable state (in a state in which torsion is not inhibited) about its own axis along the vehicle width direction.

(Arm Portion)

The arm portions 34 shown in FIG. 1 extend rearward from respective end portions of the torsion bar portion 32 in the vehicle width direction. Specifically, the arm portions 34 have a cylindrical portion 34A extending rearward from the torsion bar portion 32 and a flat portion 34B formed at the rear end of the cylindrical portion 34A. The lower end portion of the stabilizer link 28 is connected to the flat portion 34B. The upper end of the stabilizer link 28 is connected to a suspension (not shown). Thereby, the stabilizer 24 suppresses stroke difference between the left and right front wheels by transmitting the road surface input, which is input to one of the suspensions, to the other suspension.

<Motor Mount>

The motor mount 40 shown in FIG. 2 has a right mount portion 42 disposed at the front right side of the motor 22, a left mount portion 48 disposed at the front left side of the motor 22, and a rear mount portion (not shown) disposed at the rear and center of the motor 22. Here, the right mount portion 42 and the left mount portion 48, which are the main portions, are described, and description of the rear mount portion is omitted.

The right mount portion 42 is configured by a first attachment portion 44, attached to the suspension member 16 (see FIG. 1), and a second attachment portion 46, extending upward from the first attachment portion 44 toward the motor 22 and attached to the motor 22, as an integrated member.

The first attachment portion 44 has a base 44A, a front flange 44B, and a rear flange 44C as viewed in the vertical direction of the vehicle. The base 44A is formed in a rectangular plate shape which is long in the vehicle width direction and short in the front-rear direction. The base 44A, the front flange 44B and the rear flange 44C contact the upper surface of a portion of the suspension member 16 (see FIG. 1).

The front flange 44B projects forward from a front end of the base 44A. Further, in the front flange 44B, two through holes (not shown), which are spaced apart in the vehicle width direction and penetrate in the vehicle vertical direction, are formed. Bolts 45 are respectively inserted into the two through holes. The rear flange 44C projects rearward from a rear end of the base 44A. Further, in the rear flange 44C, one through hole (not shown), penetrating in the vertical direction, is formed. A bolt 45 is inserted into this one through hole.

The second attachment portion 46 extends from a top surface of the base 44A toward the bottom part and the right side part of the front right side of the motor 22. The second attachment portion 46 is fastened using a bolt and a nut (which are not shown) at the bottom part and the right side part of the front right side of the motor 22. Thereby, the right mount portion 42 has the first attachment portion 44 attached to the suspension member 16 and the second attachment portion 46 attached to the motor 22 so that a portion of the motor 22 at the right side of the center in the vehicle width direction is fixed relative to the vehicle body.

The left mount portion 48 is configured by a first attachment portion 52, attached to the suspension member 16 (see FIG. 1), and a second attachment portion 54, extending upward from the first attachment portion 52 toward the motor 22 and attached to the motor 22, as an integrated member.

The first attachment portion 52 has a base 52A, a front flange 52B, and a rear flange 52C as viewed in the vertical direction of the vehicle. The base 52A is formed in a rectangular plate shape which is long in the vehicle width direction and short in the front-rear direction. The base 52A, the front flange 52B and the rear flange 52C contact the upper surface of a portion of the suspension member 16.

The front flange 52B projects forward from a front end of the base 52A. Further, in the front flange 52B, two through holes (not shown), which are spaced apart in the vehicle width direction and penetrate in the vehicle vertical direction, are formed. Bolts 45 are respectively inserted into the two through holes. The rear flange 52C projects rearward from a rear end of the base 52A. Further, in the rear flange 52C, one through hole (not shown), penetrating in the vertical direction, is formed. A bolt 45 is inserted into this one through hole.

The second attachment portion 54 extends from the top surface of the base 52A toward the bottom part and the left side part of the front left side of the motor 22. The second attachment portion 54 is fastened using a bolt and a nut (which are not shown) at the bottom part and the left side part of the front left side of the motor 22. Thereby, the left mount portion 48 has the first attachment portion 52 attached to the suspension member 16 and the second attachment portion 54 attached to the motor 22 so that a portion of the motor 22 at the left side of the vehicle width direction center is fixed relative to the vehicle body. That is, the motor mount 40 fixes the motor 22 to the vehicle body 11.

In the following description, it is assumed that the right mount portion 42 and the left mount portion 48 are formed and arranged substantially symmetrically at left and right with respect to the vehicle width direction center (virtual line C) of the vehicle 10, for example. The left mount portion 48 will be mainly described, and description of the right mount portion 42 may be omitted.

<Stabilizer Mount>

The stabilizer mount 60 has a front right mount portion 62 disposed at the front right side of the right mount portion 42 and a front left mount portion 72 disposed at the front left side of the left mount portion 48.

The front right mount portion 62 has an upright portion 64 which stands upright from the suspension member 16 (see FIG. 1) toward the upper side, a front flange 66 projecting forward from the bottom part (lower end portion in the vehicle vertical direction) of the upright portion 64, and a rear flange 68 projecting rearward from the bottom part of the upright portion 64.

As shown in FIG. 1, the upright portion 64 is formed such that a lower portion in the vehicle vertical direction is substantially rectangular and an upper portion is semicircular when viewed in the vehicle width direction. Further, in the upright portion 64, a through hole 65, which penetrates the upright portion 64 in the vehicle width direction, is formed. The torsion bar portion 32 is inserted through the through hole 65 so as to be rotatable about its own axis with the vehicle width direction as an axial direction. Furthermore, the torsion bar portion 32 is supported by the upright portion 64.

The front flange 66 shown in FIG. 2 is formed with one through hole (not shown) penetrating in the vehicle vertical direction. A bolt 69 is inserted into this one through hole. Further, in the rear flange 68, one through hole (not shown), penetrating in the vertical direction, is formed. A bolt 69 is inserted into this one through hole. The front flange 66 and the rear flange 68 are fixed to the suspension member 16 by fastening the bolts 69 to a weld nut (not shown) on the suspension member 16 (see FIG. 1) side.

The front left mount portion 72 has an upright portion 74 which stands upright from the suspension member 16 toward the upper side, a front flange 76 projecting forward from the bottom part (lower end portion in the vehicle vertical direction) of the upright portion 74, and a rear flange 78 projecting toward the vehicle rear side from the bottom part of the upright portion 74.

The upright portion 74 is formed such that the lower portion in the vehicle vertical direction is substantially rectangular and the upper portion is semicircular when viewed in the vehicle width direction. Further, in the upright portion 74, a through hole 75 (see FIG. 1), which penetrates the upright portion 74 in the vehicle width direction is formed. The torsion bar portion 32 is inserted through the through hole 75 so as to be rotatable about its own axis with the vehicle width direction as an axial direction. Furthermore, the torsion bar portion 32 is supported by the upright portion 74.

Further, in the rear flange 76, one through hole (not shown), penetrating in the vehicle vertical direction, is formed. A bolt 69 is inserted into this one through hole. Further, in the rear flange 78, one through hole (not shown), penetrating in the vertical direction, is formed. A bolt 69 is inserted into this one through hole. The front flange 76 and the rear flange 78 are fixed to the suspension member 16 by fastening the bolts 69 to a weld nut (not shown) on the suspension member 16 (see FIG. 1) side.

Here, the stabilizer mount 60 is fixed to the suspension member 16 to support both end portions of the torsion bar portion 32 in the vehicle width direction. In the following description, it is assumed that the front right mount portion 62 and the front left mount portion 72 are formed and arranged substantially symmetrically with respect to virtual line C, for example. The front left mount portion 72 will be mainly described, and description of the front right mount portion 62 may be omitted.

<Arrangement of Respective Parts>

The motor 22 is disposed at the rear side with respect to the torsion bar portion 32 and at an inner side in the vehicle width direction with respect to the arm portions 34, so as not to contact the stabilizer 24. The motor mount 40 (the right mount portion 42 and the left mount portion 48), as viewed in the vehicle vertical direction, is disposed at a position between the motor 22 and the torsion bar portion 32, with parts of the motor mount 40 disposed at respective outer sides in the vehicle width direction relative to the motor 22.

The stabilizer mount 60 (front right mount portion 62 and front left mount portion 72) is disposed further toward the front side than the motor mount 40 when viewed in the vehicle vertical direction, and a portion thereof is disposed so as to be aligned with the motor mount 40 in the front-rear direction.

Figure 3:
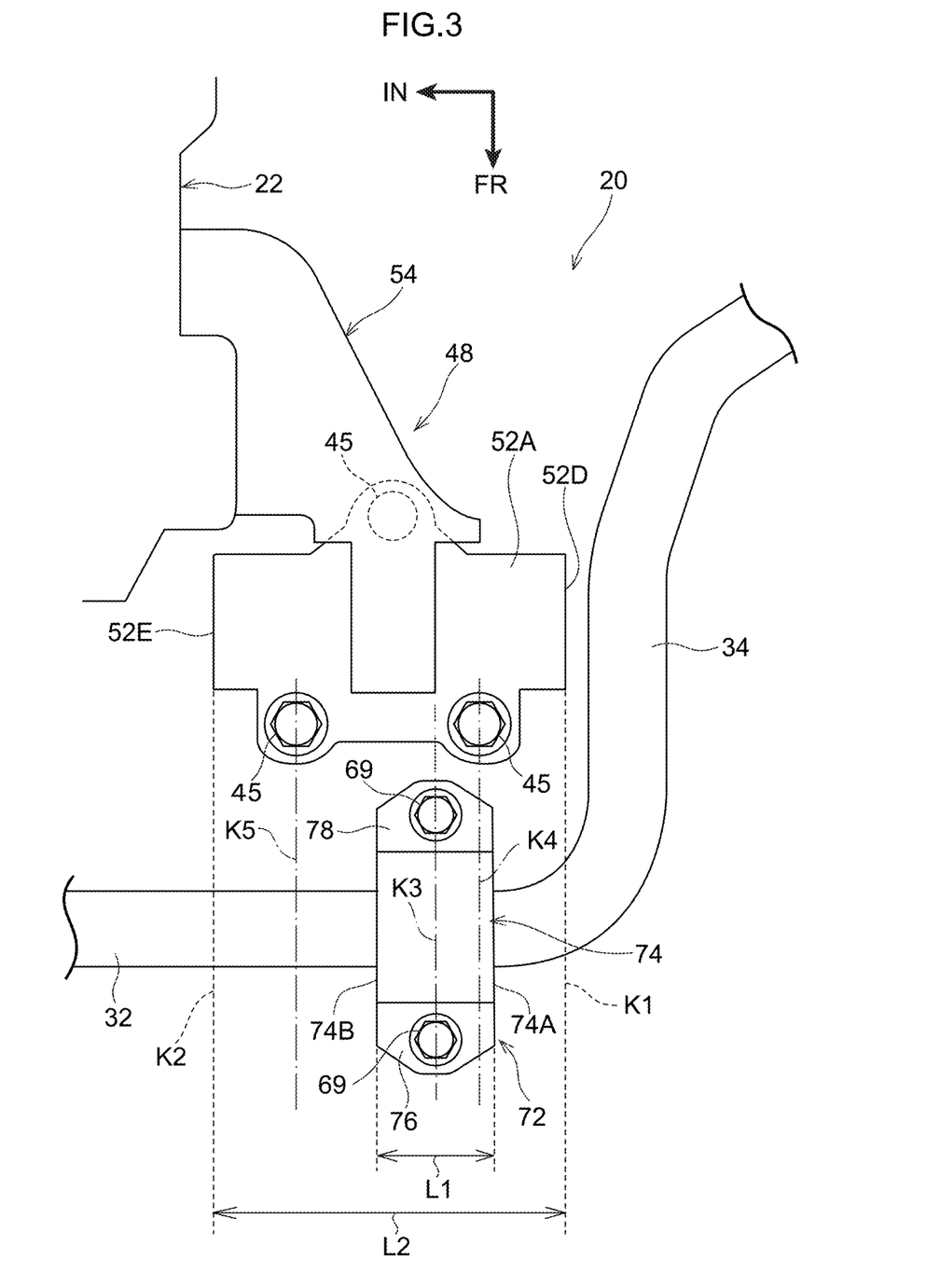
FIG. 3 is a partial enlarged plan view of the vehicle front portion structure according to the first embodiment.

FIG. 3 shows the front left portion of the vehicle front portion structure 20 as viewed in the vertical direction. Here, the length in the vehicle width direction of the upright portion 74 is L1 (mm), and the length in the vehicle width direction of the base 52A is L2 (mm). L1<L2 is satisfied. Further, when viewed in the front-rear direction of the vehicle, the outer end surface 74A in the vehicle width direction of the upright portion 74 is disposed further inward in the vehicle width direction than the outer end surface 52D in the vehicle width direction of the base 52A. Furthermore, when viewed in the front-rear direction of the vehicle, the inner end surface 74B in the vehicle width direction of the upright portion 74 is disposed further outward in the vehicle width direction than the inner end surface 52E in the vehicle width direction of the base 52A. In other words, the front left mount portion 72 of the stabilizer 24 overlaps with the left mount portion 48 of the motor mount 40 when viewed in the front-rear direction of the vehicle.

A line extending in the vehicle front-rear direction toward the front from the outer end surface 52D in the vehicle width direction of the base 52A is referred to as virtual line K1, and a line extending in the vehicle front-rear direction toward the front from the inner end surface 52E is referred to as virtual line K2. The front left mount portion 72 is disposed between the virtual line K1 and the virtual line K2 in the vehicle width direction.

A line connecting the center of the bolt 69 fixing the front flange 76 of the front left mount portion 72 and the center of the bolt 69 fixing the rear flange 78 is referred to as virtual line K3. The virtual line K3 extends in the front-rear direction, for example. A line passing through the center of the bolt 45 fixing the front left side of the first attachment portion 52 along the front-rear direction is referred to as virtual line K4. A line passing through the center of the bolt 45 fixing the front right side of the first attachment portion 52 along the front-rear direction is referred to as virtual line K5. Here, the virtual line K3 is disposed between the virtual line K4 and the virtual line K5 in the vehicle width direction. Further, in the vehicle width direction, the distance between virtual line K3 and virtual line K4 is shorter than the distance between virtual line K3 and virtual line K5, for example.

[Action and Effects]

Next, the action of the vehicle front portion structure 20 of the first embodiment will be described.

In the vehicle front portion structure 20 shown in FIG. 2, the motor mount 40 is disposed at respective outer sides in the vehicle width direction with respect to the motor 22 and between the motor 22 and the torsion bar portion 32. Thus, the distance between the motor 22 and the motor mount 40 can be increased as compared with a configuration in which the motor mount 40 is disposed at the front side with respect to the center in the vehicle width direction of the motor 22. A longer distance between the motor 22 and the motor mount 40 means a broader range across which the motor mount 40 can be deformed when a collision load to the vehicle 10 is input to the vehicle body 11 (see FIG. 1). For example, in a case in which a collision load is input to the vehicle body 11, the second attachment portions 46 and 54 can be deformed. In other words, dead stroke of the motor mount 40 with respect to the motor 22 in the vehicle 10 can be reduced.

Furthermore, in the vehicle front portion structure 20, the stabilizer mount 60 is disposed forward of the motor mount 40, and a portion of the stabilizer mount 60 is disposed so as to be aligned with the motor mount 40 in the vehicle front-rear direction. The stabilizer mount 60 supports both end portions of the torsion bar portion 32. Therefore, the arm portions 34 are disposed apart from the motor mount 40 in the vehicle width direction, and the stabilizer mount inhibits the arm portions 34 from deforming toward the side of the motor mount 40. Thereby, contact between the stabilizer 24 and the motor mount 40 can be suppressed. That is, in the vehicle front portion structure 20, dead stroke of the motor mount 40 in the vehicle 10 can be reduced and contact between the stabilizer 24 and the motor mount 40 can be suppressed.

Second Embodiment

Next, vehicle front portion structure 80 of the second embodiment will be described.

Figure 4:
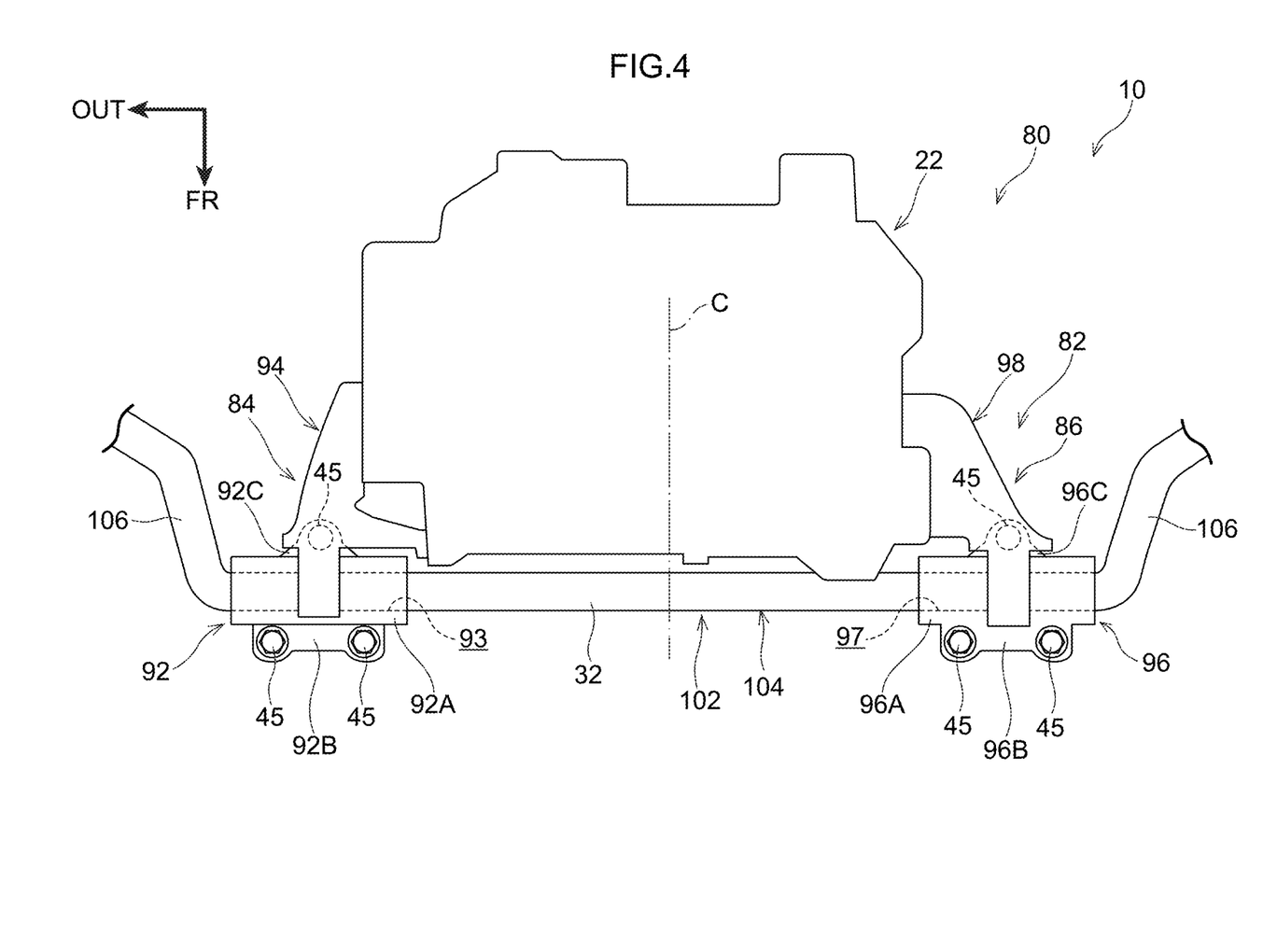
FIG. 4 is a plan view of the vehicle front portion structure pertaining to a second embodiment.

The vehicle front portion structure 80 shown in FIG. 4 is provided instead of the vehicle front portion structure 20 (see FIG. 1) in the vehicle 10 (see FIG. 1). In addition, regarding configuration that is basically the same as in the vehicle front portion structure 20, the same reference numerals are provided and description is omitted.

The vehicle front portion structure 80 includes a motor 22, a stabilizer 102, and a composite mount 82 as an example of a fixing member.

<Stabilizer>

Stabilizer 102 has stabilizer bar 104 and stabilizer link 28 (refer to FIG. 1), for example. The stabilizer bar 104 is formed of a pipe material, for example, but may be formed of a solid rod material. Further, the stabilizer bar 104 has a torsion bar portion 32, and an arm portion 106 as an example of an arm portion.

The torsion bar portion 32 is disposed at the front side with an interval with respect to the motor 22 and the composite mount 82, which is described below. The torsion bar portion 32 is supported by the composite mount 82, which is described below, in a rotatable state (in a state in which torsion is not inhibited) about its own axis along the vehicle width direction.

The arm portions 106 extend rearward from respective end portions in the vehicle width direction of the torsion bar portion. At the rear end of the arm portion 106, a flat portion (not shown) is formed. The lower end portion of the stabilizer link 28 (see FIG. 1) is connected to the flat portion. Thereby, the stabilizer 102 suppresses stroke difference between the left and right front wheels by transmitting the road surface input, which is input to one of the suspensions, to the other suspension. The length from the front end to the rear end of the arm portion 106 is shorter than the length from the front end to the rear end of the arm portion 34 (see FIG. 2) of the first embodiment in the vehicle front-rear direction.

<Composite Mount>

The composite mount 82 has a right mount portion 84 disposed at the front right side of the motor 22, a left mount portion 86 disposed at the front left side of the motor 22, and a rear mount portion (not shown) disposed at the rear and center of the motor 22. Here, the right mount portion 84 and the left mount portion 86, which are the main portions, are described, and description of the rear mount portion is omitted.

The right mount portion 84 is configured by a first attachment portion 92, attached to the suspension member 16 (see FIG. 1), and a second attachment portion 94, extending toward the vehicle upper side from the first attachment portion 92 toward the motor 22 and attached to the motor 22, as an integrated member.

The first attachment portion 92 is an example of a stabilizer support portion, and includes a base 92A, a front flange 92B, and a rear flange 92C as viewed in the vehicle vertical direction. The base 92A is formed such that the lower portion in the vehicle vertical direction is substantially rectangular and the upper portion is semicircular when viewed in the vehicle width direction. Further, in the base 92A, a through hole 93 is formed which penetrates the base 92A in the vehicle width direction. The torsion bar portion 32 is inserted through the through hole 93 so as to be rotatable about its own axis with the vehicle width direction as an axial direction. The right end part of the torsion bar portion 32 is supported by the base 92A. The base 92A, the front flange 92B and the rear flange 92C contact the upper surface of a portion of the suspension member 16 (see FIG. 1).

The front flange 92B projects forward from a front end of the base 92A. Further, in the front flange 92B, two through holes (not shown), which are spaced apart in the vehicle width direction and penetrate in the vehicle vertical direction, are formed. Bolts 45 are respectively inserted into the two through holes. The rear flange 92C projects rearward from a rear end of the base 92A. Further, in the rear flange 92C, one through hole (not shown), penetrating in the vehicle vertical direction, is formed. A bolt 45 is inserted into this one through hole.

The second attachment portion 94 is an example of a motor fixing portion, and extends from the upper surface (outer peripheral surface) of the base 92A toward the bottom part and the right side part of the front right side of the motor 22. The second attachment portion 94 is fastened using a bolt and a nut (which are not shown) at the bottom part and the right side part of the front right side of the motor 22. Thereby, the right mount portion 84 has the first attachment portion 92 attached to the suspension member 16 and the second attachment portion 94 attached to the motor 22 so that a right side portion of the motor 22 is fixed relative to the vehicle body.

The left mount portion 86 is configured by a first attachment portion 96, attached to the suspension member 16 (see FIG. 1), and a second attachment portion 98, extending upward from the first attachment portion 96 toward the motor 22 and attached to the motor 22, as an integrated member.

The first attachment portion 96 is an example of a stabilizer support portion, and includes a base 96A, a front flange 96B, and a rear flange 96C as viewed in the vehicle vertical direction. The base 96A is formed such that the lower portion in the vehicle vertical direction is substantially rectangular and the upper portion is semicircular, when viewed in the vehicle width direction. Further, in the base 96A, a through hole 97 is formed which penetrates the base 96A in the vehicle width direction. The torsion bar portion 32 is inserted through the through hole 97 so as to be rotatable about its own axis with the vehicle width direction as an axial direction. The left end part of the torsion bar portion 32 is supported by the base 96A. The base 96A, the front flange 96B and the rear flange 96C contact the upper surface of a portion of the suspension member 16 (see FIG. 1).

The front flange 96B projects forward from a front end of the base 96A. Further, in the front flange 96B, two through holes (not shown), which are spaced apart in the vehicle width direction and penetrate in the vehicle vertical direction, are formed. Bolts 45 are respectively inserted into the two through holes. The rear flange 96C projects rearward from a rear end of the base 96A. Further, in the rear flange 96C, one through hole (not shown), penetrating in the vertical direction, is formed. A bolt 45 is inserted into this one through hole.

The second attachment portion 98 is an example of a motor fixing portion, and extends from the upper surface (outer peripheral surface) of the base 96A toward the bottom part and the left side part of the front left side of the motor 22. The second attachment portion 98 is fastened using a bolt and a nut (which are not shown) at the bottom part and the left side part of the front left side of the motor 22. Thereby, the left mount portion 86 has the first attachment portion 96 attached to the suspension member 16 and the second attachment portion 98 attached to the motor 22 so that a left side portion of the motor 22 is fixed relative to the vehicle body.

In the following description, it is assumed that the right mount portion 84 and the left mount portion 86 are formed and arranged substantially symmetrically at left and right with respect to the vehicle width direction center (virtual line C) of the vehicle 10, for example. The left mount portion 86 will be mainly described, and description of the right mount portion 84 may be omitted.

<Arrangement of Respective Parts>

The composite mount 82 (the right mount portion 84 and the left mount portion 86), as viewed in the vehicle vertical direction, is disposed at a position between the motor 22 and the torsion bar portion 32, with a part of the composite mount 82 disposed at respective outer sides in the vehicle width direction relative to the motor 22.

Figure 5:
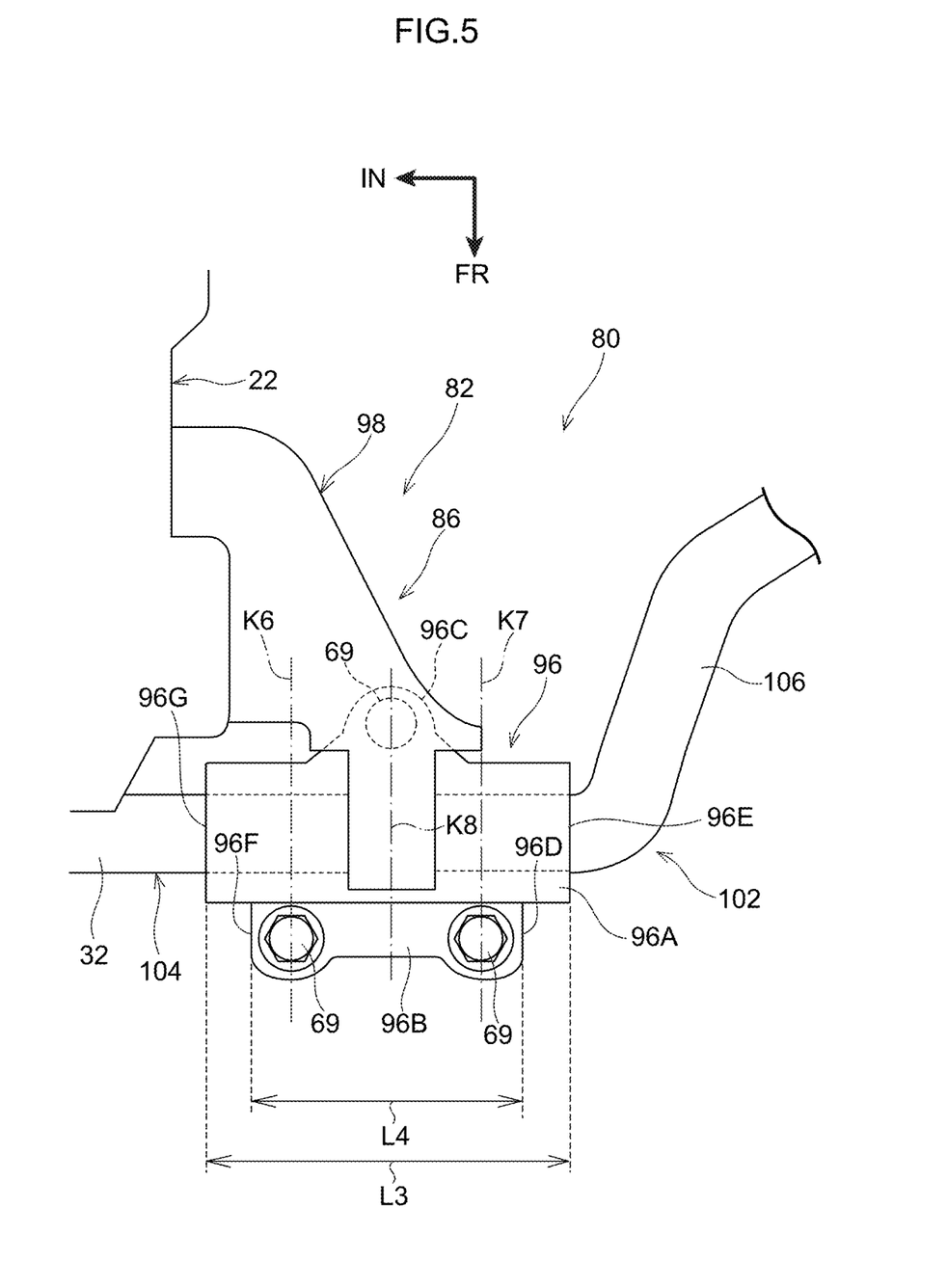
FIG. 5 is a partial enlarged plan view of the vehicle front portion structure pertaining to the second embodiment.

FIG. 5 shows the front left portion of the vehicle front portion structure 80 as viewed in the vehicle vertical direction. The length of the base 96A in the vehicle width direction is L3 (mm), and the length of the front flange 96B in the vehicle width direction is L4 (mm). L4<L3 is satisfied. Further, when viewed in the vehicle front-rear direction, the outer end surface 96D in the vehicle width direction of the front flange 96B is disposed further inward in the vehicle width direction than the outer end surface 96E in the vehicle width direction of the base 96A. Furthermore, when viewed in the front-rear direction, the inner end surface 96F in the vehicle width direction of the front flange 96B is disposed further outward in the vehicle width direction than the inner end surface 96G in the vehicle width direction of the base 96A. In other words, when viewed in the front-rear direction of the vehicle, the front flange 96B overlaps with the base 96A.

A line passing through the center of the bolt 69 fixing the front right portion of the front flange 96B along the vehicle front-rear direction is referred to as virtual line K6. A line passing through the center of the bolt 69 fixing the front left portion of the front flange 96B along the vehicle front-rear direction is referred to as virtual line K7. A line passing through the center of the bolt 69 fixing the rear flange 96C along the vehicle front-rear direction is referred to as virtual line K8. Here, the virtual line K8 is disposed between the virtual line K6 and the virtual line K7 in the vehicle width direction. In the vehicle width direction, the distance between the virtual line K6 and the virtual line K8 is approximately the same as the distance between the virtual line K7 and the virtual line K8.

[Action and Effects]

Next, the action of the vehicle front portion structure 80 of the second embodiment will be described.

In the vehicle front portion structure 80 shown in FIG. 4, the composite mount 82 (right mount portion 84, left mount portion 86) is disposed at respective outer sides in the vehicle width direction with respect to the motor 22 and between the motor 22 and the torsion bar portion 32. Thus, the distance between the motor 22 and the composite mount 82 can be increased as compared with a configuration in which the composite mount 82 is disposed at the front side of the vehicle with respect to the center of the motor 22 in the vehicle width direction. A longer distance between the motor 22 and the composite mount 82 means that a broader range across which the composite mount 82 can be deformed when a collision load is input to the vehicle body 11 (see FIG. 1). For example, in a case in which a collision load is input to the vehicle body 11, the second attachment portions 94 and 98 can be deformed. In other words, dead stroke of the composite mount 82 with respect to the motor 22 in the vehicle 10 can be reduced.

Furthermore, in the vehicle front portion structure 80, the first attachment portions 92, 96 are disposed on the vehicle front side relative to the second attachment portions 94, 98, and a portion of the first attachment portions 92, 96 are arranged so as to be aligned with the second attachment portions 94, 98 in the vehicle front-rear direction. The first attachment portions 92 and 96 support respective end portions of the torsion bar portion 32. As a result, the arm portions 106 are disposed apart from the second attachment portions 94 and 98 in the vehicle width direction, and the first mounting portions 92, 96 inhibit the arm portions 106 from deforming toward the side of the second attachment portions 94 and 98. Therefore, contact between the stabilizer 102 and the second attachment portions 94 and 98 of the composite mount 82 can be suppressed. That is, in the vehicle front portion structure 80, dead stroke of the second attachment portions 94 and 98 of the composite mount 82 in the vehicle 10 can be reduced and contact between the stabilizer 102 and the second attachment portions 94 and 98 of the composite mount 82 can be suppressed.

In the vehicle front portion structure 80, the second attachment portion 94 and the first attachment portion 92 are integrally molded, and the second attachment portion 98 and the first attachment portion 96 are integrally molded, whereby the composite mount 82 is formed. Thus, as compared to a configuration in which the second attachment portion 94 and the first attachment portion 92, and the second attachment portion 98 and the first attachment portion 96, are separately provided, the respective fixing regions of the fixing portions of the motor 22 and of the support portions of the stabilizer 102 in the vehicle body 11 (see FIG. 1) are reduced in number. Here, these fixing regions are portions that are less likely to be deformed than a portion that is not fixed and are portions at which dead stroke occurs. That is, in the composite mount 82, since the second attachment portions 94 and 98 and the first attachment portions 92 and 96 are integrally molded, the fixing regions are replaced with a deformable portion. Dead stroke can be shortened as compared with a configuration in which the second attachment portions 94 and 98 and the first attachment portions 92 and 96 are provided separately.

Furthermore, in the vehicle front portion structure 80, as described above, the respective fixing regions of the fixing portions of the motor 22 and of the support portions of the stabilizer 102 in the vehicle body 11 (see FIG. 1) are reduced in number, whereby the stabilizer 102 can be brought closer to the motor 22. As a result, the length of the arm portion 106 in the front-rear direction of the vehicle can be shorter than in a configuration in which the fixing portions of the motor 22 and the support portions of the stabilizer 102 are provided separately, whereby operational stability of the vehicle 10 is improved. In addition, the number of component parts can be reduced by reducing the number of the respective fixing regions of the fixing portions of the motor 22 and of the support portions of the stabilizer 102.

Note that the present disclosure is not limited to the above-described embodiments.

Instead of only a part of the motor mount 40 according to the first embodiment, rather, the entire motor mount 40 may be disposed at respective outer sides in the vehicle width direction with respect to the motor 22 and between the motor 22 and the torsion bar portion 32. The total number of fastening portions of the first attachment portions 44 and 52 in the motor mount 40 is not limited to three, and may be two, or four or more. The number of fastening portions of the first attachment portions 44 and 52 may be the same on the front side and the rear side. An adhesive may be used to fix the first attachment portions 44 and 52.

Instead of only a part of the stabilizer mount 60, rather, the whole stabilizer mount 60 may be disposed so as to be aligned with the motor mount 40 in the vehicle front-rear direction. The number of fastening portions of the front flange 66 and the rear flange 68 is not limited to one, and may be two or more. The virtual line K3 may be disposed at an inner side in the vehicle width direction with respect to the virtual line K5 or at an outer side in the vehicle width direction with respect to the virtual line K4.

Instead of only a part of the composite mount 82 according to the first embodiment, rather, the entire composite mount 82 may be disposed at respective outer sides in the vehicle width direction with respect to the motor 22 and between the motor 22 and the torsion bar portion 32. The total number of fastening portions in the composite mount 82 is not limited to three, and may be two, or four or more. The number of fastening portions of the composite mount 82 may be the same on the front side and the rear side. An adhesive may be used to secure the composite mount 82.

Explanation has been given above regarding exemplary embodiments of the present disclosure. However, the present disclosure is not limited to the foregoing, and, clearly, various modifications to the foregoing may be implemented within a range that does not deviate from the gist of the present disclosure.

What is claimed is:

1. A vehicle front portion structure, comprising:
    a motor;
    a stabilizer having an extending portion that is disposed at a vehicle front side of the motor and that extends further in a vehicle width direction than a length of the motor in the vehicle width direction, and having an arm portion that extends toward a vehicle rear side from each end, in the vehicle width direction, of the extending portion;
    a plurality of motor fixing portions that fix the motor to a vehicle body, at least a part of the motor fixing portions being disposed at respective outer sides in the vehicle width direction relative to the motor and at a position at a front side in a vehicle front-rear direction relative to the motor between the motor and the extending portion, as viewed in a vehicle vertical direction; and
    a plurality of stabilizer support portions that are fixed to the vehicle body and that support respective end parts, in the vehicle width direction, of the extending portion, the stabilizer support portions being disposed further toward a front side in a vehicle front-rear direction than the motor fixing portions, and at least a part of the stabilizer support portions being aligned with the motor fixing portions in the vehicle front-rear direction,
    wherein a motor fixing portion of the plurality of motor fixing portions is fastened at a bottom part and a right side part of a front-right side of the motor, and a portion of the motor fixing portion of the plurality of motor fixing portions extends diagonally forward and outward from the front-right side of the motor.

2. The vehicle front portion structure of claim 1, further comprising a plurality of fixing members, a motor fixing portion of the plurality of motor fixing portions and a stabilizer support portion of the plurality of stabilizer support portions being integrally formed in each of the fixing members.

3. The vehicle front portion structure of claim 1, wherein each of the motor fixing portions comprises a first attachment portion that is configured to be attached to a suspension of a vehicle and a second attachment portion that is attached to the motor, and the second attachment portion extends from the first attachment portion rearward and toward an inner side in the vehicle width direction, toward the motor.

4. The vehicle front portion structure of claim 2, wherein:
    the motor fixing portion extends from the stabilizer support portion, rearward and inward in the vehicle width direction, toward the motor, and the motor fixing portion is attached to the motor, and
    the stabilizer support portion is configured to be attached to a suspension of a vehicle.

* * * * *